United States Patent

[11] 3,558,923

[72] Inventor Michiyuki Uenohara
Scotch Plains, N.J.

[21] Appl. No. 667,295
[22] Filed Sept. 12, 1967
[45] Patented Jan. 26, 1971
[73] Assignee Bell Telephone Laboratories, Incorporated
Murray Hill, N.J.
a corporation of New York
Continuation-in-part of application Ser. No. 542,170, Apr. 12, 1966, now abandoned.

[54] CIRCUIT ARRANGEMENT INCLUDING TWO-VALLEY SEMICONDUCTOR DEVICE
2 Claims, 10 Drawing Figs.

[52] U.S. Cl. .......... 307/260, 307/252, 307/258, 307/283, 307/286, 307/322, 328/164, 331/107, 331/115
[51] Int. Cl. .......... H03k 5/01
[50] Field of Search .......... 307/206, 252, 258, 260, 283, 286, 322; 328/164, 13; 331/15, 107(G)

[56] References Cited

UNITED STATES PATENTS

| | | | |
|---|---|---|---|
| 3,054,070 | 9/1962 | Rutz | 307/322X |
| 3,119,936 | 1/1964 | Bergman | 307/286 |
| 3,365,583 | 1/1968 | Gunn | 331/107(G)X |

OTHER REFERENCES

An article titled " Some Aspects of Gunn Effect Oscillators" written by P. N. Robson & S. M. Mahrous in the December 1965 issue of The Radio & Electronci Engineer, pp 345— 351. A copy of this article is located in 331/107 (G) in Group 250.

*Primary Examiner*—Stanley T. Krawczewicz
*Attorneys*—R. J. Guenther and Arthur J. Torsiglieri

ABSTRACT: A two-valley semiconductor device, biased below the threshold voltage for triggering or sustaining oscillations, is triggered by input pulses to release an output that is an amplified or regenerated form of the input. In another embodiment an analogue signal input is encoded into a pulse position modulation train.

INVENTOR
M. UENOHARA
BY
Roderick B. Anderson
ATTORNEY

CIRCUIT ARRANGEMENT INCLUDING TWO-VALLEY SEMICONDUCTOR DEVICE

CROSS-REFERENCE TO RELATED APPLICATION

This application is a continuation-in-part of my copending application, Ser. No. 542,170, filed Apr. 12, 1966, now abandoned, and assigned to Bell Telephone Laboratories, Incorporated.

BACKGROUND OF THE INVENTION

This invention relates to circuit arrangements employing services of a compound semiconductor in which instabilities are produced by the transfer of "hot" electrons between two conduction-band valleys with greatly difference mobilities and separated in energy. Such devices are typically described as two-valley semiconductor devices and the theory of such devices is described in detail in a series of papers in the Jan. 1966 issue of the IEEE Transactions on Electron Devices, Volume ED-13, Number 1.

More particularly, the invention relates to pulse generation arrangements employing two-valley semiconductor devices.

As is set forth in the papers mentioned above, when the voltage applied to opposite ends of a suitable sample of an appropriate two-valley semiconductor, such as gallium arsenide, is increased, the average sample current increases almost linearly to a maximum value and then drops sharply to a fraction of this maximum value. Above this critical voltage the average sample current remains essentially constant. If the instantaneous current waveform is analyzed, it is found to be oscillating periodically at a frequency related to the sample length. This critical voltage marking the drop in sample current and the initiation of oscillations will be termed the threshold voltage of oscillations $V_t$.

It is now believed that the oscillations are associated with the nucleation adjacent to the negative electrode and travel toward the positive electrode of a high electric field domain. Moreover, even if the applied voltage is suddenly dropped below the threshold value, the high field domain persists and continues its drift toward the positive electrode so long as the voltage is maintained above a minimum value to be termed the sustaining voltage of the domain $V_D$. The time taken for the domain to transverse the sample, or domain transit time $\tau$ is approximately equal to the sample length $l$ between opposite contacts divided by the carrier drift velocity $\nu_0$.

SUMMARY OF THE INVENTION

In accordance with a preferred embodiment of the present invention, a two-valley semiconductor device is included in a circuit arrangement which includes a DC voltage source which establishes a steady bias on the device less than the threshold voltage $V_T$, a signal source supplying a pulse train which has become distorted in transmission and which it is desired to regenerate and amplify free of such distortion, and a load or utilization branch in which is developed the desired regenerated and amplified pulse train. The two-valley device may be biased above or below the sustaining voltage greater than $V_D$. However, by biasing the device at a voltage greater than $V_D$ but less than $V_T$, an incoming pulse having a duration less than the transit time $\tau$ can be made to trigger the device to generate an output pulse of prescribed duration $\tau$.

In a related embodiment of the invention, a two-valley semiconductor is included in a circuit with a suitable voltage bias source, a source of an analogue signal to be encoded into a pulse position modulation train, and a load or utilization branch.

It is characteristic of these embodiments that they are basically very simple to instrument, have very high speeds, can handle appreciable powers, and can produce amplification of the desired pulse train.

DRAWING DESCRIPTION

The invention will be more fully described with reference to the accompanying drawings in which.

DETAILED DESCRIPTION

Figure 1:
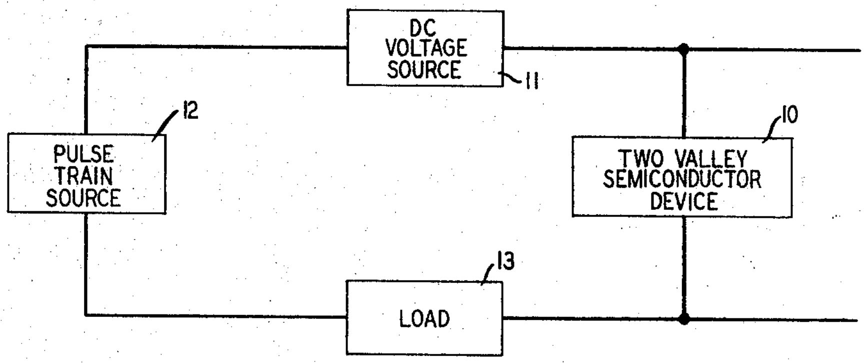
FIG. 1 shows a pulse regenerator in accordance with the preferred embodiment of the invention.

With reference now to the drawing, FIG. 1 shows in block form the basic elements of a pulse regenerator in accordance with the invention. The two-valley semiconductor device 10, which typically would be a gallium arsenide wafer provided with a pair of spaced electrodes, is connected serially with a DC voltage source 11, a source 12 of the signal pulse train to be regenerated, and a load or utilization branch 13. The voltage bias $W_B$ provided by voltage source 11 is arranged to be sufficiently less than the threshold voltage for oscillations $V_T$ that the likelihood that oscillations will be triggered by noise rather than a true signal pulse of the pulse train is sufficiently low. The inclusion of a voltage bias source in this way permits amplification of the regenerated pulse train. The bias should also be less than the voltage $V_S$ needed to sustain oscillations once initiated. As is discussed in my copending application, Ser. No. 542,168 filed Apr. 12, 1966, U.S. Pat. No. 3,508,210, contemporaneously with the parent application and assigned to the same assignee as the instant application, I have found that, in these devices, oscillations once initiated tend to be sustained so long as there is maintained a bias voltage typically equal to about 95 percent of the threshold value $V_T$. Since in the present instance, it is desirable that the oscillations be terminated as soon as possible after termination of a real pulse of the pulse train, the bias voltage should be close to but less than the sustaining voltage $V_S$, typically about 94 percent of the threshold voltage. The bias voltage $V_B$ may be above or below the sustaining voltage of the domain $V_D$. If $V_B$ is above $V_D$, a high-field domain, once formed, will persist until it reaches the positive contact even if the superposed pulse voltage falls below $V_T$. In some instances, where the amplitude of signal pulses is sufficiently high, it may be feasible to dispense with the DC voltage source. In this case, amplification is not realized.

The pulse train source 12 could take a variety of forms. In some instances, it may be the output stage of an amplifier to which had been supplied the transmitted signal after reception. In other instances, it may be the antenna used to pick up the radiated signal pulse train.

The nature of utilization apparatus 13 also would depend on the use which the pulse regeneration is to serve. As will appear below, the output information can be derived in a variety of forms. Moreover, it should be apparent that the desired output can be derived by connecting the load across the semiconductive element.

Figure 2A:
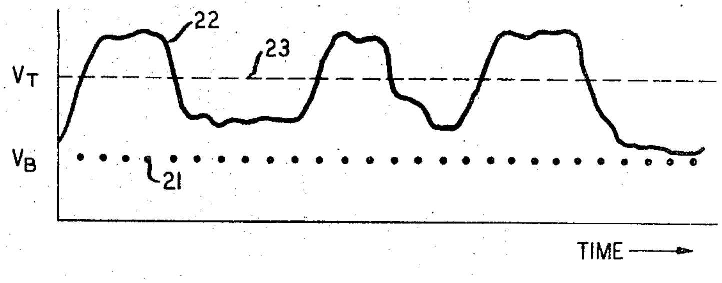
FIGS. 2A through 2C are waveforms helpful to an understanding of the operation of the pulse regenerator of FIG. 1.

In FIG. 2A is depicted the waveforms of the various applied voltages of interest. The dotted line 21 depicts the voltage $V_B$ supplied by source 11 on which is impressed the varying voltage supplied by the pulse train source such that the effective voltage applied has the waveform shown by the solid line 22. This varying voltage corresponds to a pulse train originally having the waveform shown in FIG. 2B, which has been distorted in transmission. The threshold voltage for initiating oscillations $V_T$ is shown by the dashed line 23.

Figure 2B:
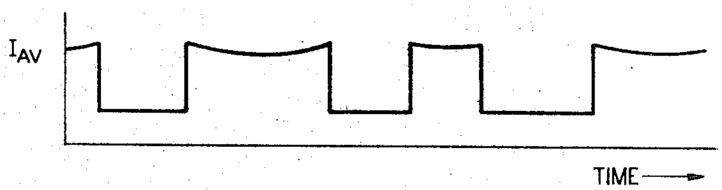

In FIG. 2B there is plotted on the same time scale as is used in FIG. 2A the average current flowing through the sample. It can be noted that the average current falls sharply as the applied voltage increases beyond the threshold voltage and is thereafter relatively insensitive to variations in the applied voltage until the applied voltage drops below the threshold voltage. Actually the oscillations and the low average current condition persist until the applied voltage falls below the value needed to sustain oscillations, which as previously described is slightly less than the threshold voltage. This phenomenon results because of transient effects, but the lower the product $nL$ (where $n$ is charge carrier density in the sample and L is the length of the sample between electrodes) the more nearly the sustaining voltage of oscillations equals the threshold voltage. Accordingly, the difference can be kept small by appropriate design of the sample and the associated circuitry to minimize excess reactance. Conversely, the difference can be increased if desired by increasing $nL$.

Figure 2C:
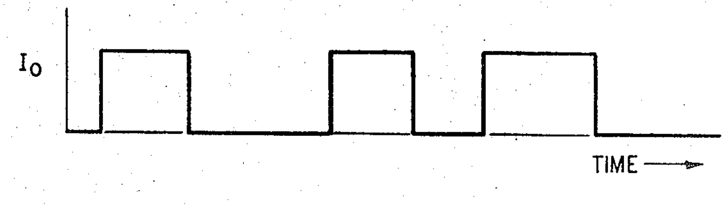

It is characteristic that during the interval when the average current is low there will also be oscillatory current flow in the circuit superposed on a steady current. In FIG. 2C, there is depicted the envelope of the oscillatory current $I_0$ that flows in the circuit.

It is obvious that there are alternative possibilities for deriving the output information from the original pulse train.

First, since the average current flowing through the circuit has the waveform of the original pulse train, (except for the inversion in sign) the average voltage across a resistive load will also have the desired waveform and accordingly such voltage can be utilized for further processing as the signal pulse train. In such a case, it would be advantageous to filter out the oscillatory component superposed on the steady component.

Additionally, since the envelope of the oscillatory current flowing in the circuit corresponds to the desired regenerated pulse train, the envelope of the oscillatory voltage across a resistive load will have the desired output waveform and, accordingly, such voltage can be utilized for further processing as the signal. In this instance, it will be advantageous to remove the steady component.

Which of the two techniques described for deriving the desired regenerated pulse train is to be preferred depends on the nature of the further processing intended for the derived pulse train. When the oscillatory current is utilized, the derived pulse train comprises a train of bursts of oscillatory energy with the frequency of oscillations being governed by the geometry of the sample in the manner characteristic of two-valley semiconductor devices.

The foregoing discussion presupposes a duration of each output pulse, in response to an input pulse that extends above voltage $V_T$ for substantially the same duration, which is greater than the domain transit time $\pi$, where $$\tau=\frac{l}{v_0} \qquad (1)$$

where $l$ is the sample length of the two-valley device between opposite contacts and $v_0$ is the domain drift velocity.

Figure 3A:
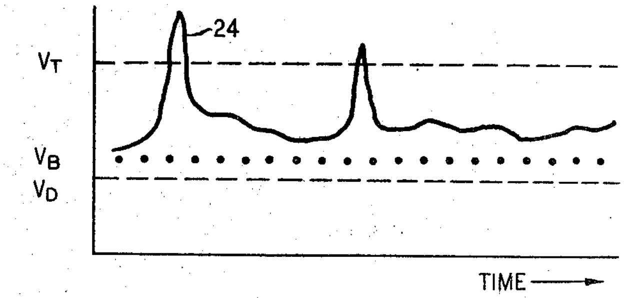
FIGS. 3A and 3B are waveforms helpful to an understanding of another mode of operation of the pulse regenerator of FIG. 1.
Figure 3B:
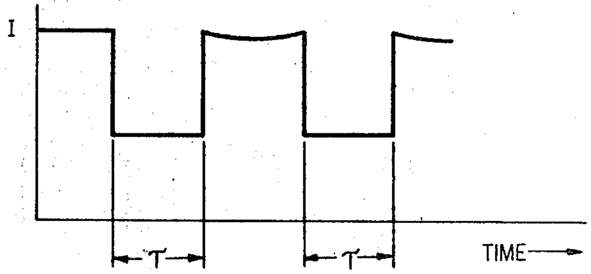

Because the domain transit time $\tau$ is a fixed parameter, the circuit of FIG. 1 can be operated such to release pulses of duration $\tau$ in response to incoming pulses of any varying duration less than $\tau$. Referring to FIG. 3A, assume that the two-valley device 10 is biased at a voltage $V_B$ above the voltage $V_D$ for sustaining a domain. Then, whenever the waveform 24 exceeds the threshold voltage $V_T$, a domain is formed in the two-valley device that persists during its transit time $\tau$ even if in the interim the input waveform voltage drops below $V_T$. During transit time $\tau$, the current in the load drops as shown in FIG. 3B.

If the duration of all the triggering pulses superposed on the bias voltage are smaller than $\tau$, then all of the output pulses will have a uniform duration $\tau$ regardless of nonuniformities of input pulses duration. This mode of operation has obvious advantages where the pulses of a pulse train to be regenerated each have durations on the order of $10^{-8}$ to $10^{-11}$ second, which are consistent with values of $\tau$ that can be realized by presently known two-valley devices. Then the pulse width, as well as pulse height or amplitude can be regenerated.

Figure 4:
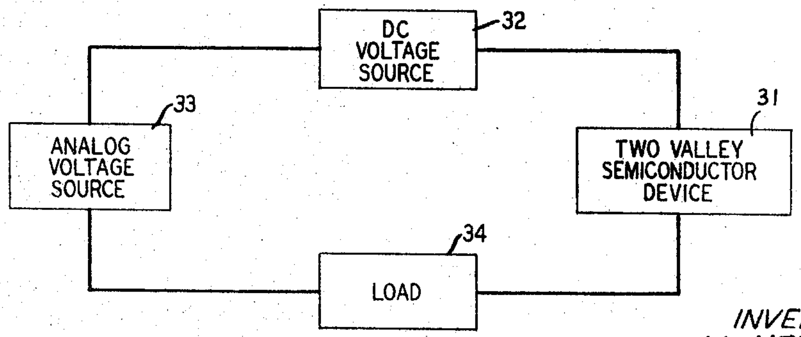
FIG. 4 shows an encoder for translating an analogue signal into a pulse position modulation train in accordance with another embodiment of the invention.

In FIG. 4, there is shown schematically an arrangement whereby an analogue signal is encoded into a pulse position modulation train of pulses. The two-valley semiconductor device 31 of the kind previously described is connected serially with a DC voltage source 32, a source 33 of the analogue signal to be encoded, and a load or utilization branch 34. Again the voltage $V_B$ of the source 32 is typically adjusted to maintain a bias across the element 31 slightly below the value at which oscillations initiated are sustained, and its inclusion permits obtaining amplification.

Figure 5A:
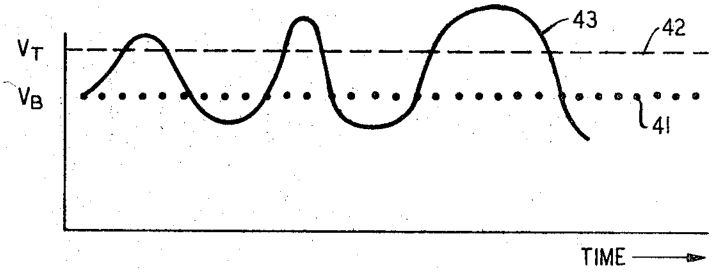
FIGS. 5A through 5C are waveforms helpful in understanding the operation of the encoder of FIG. 4.
Figure 5B:
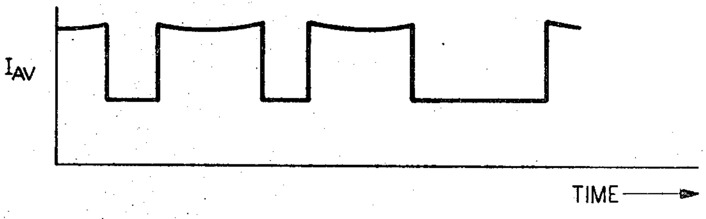
Figure 5C:
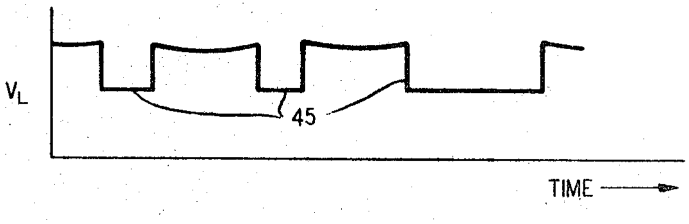

In FIGS. 5A through 5C are shown the waveforms of the relevant voltages and current in the circuit depicted. In FIG. 5A, the steady voltage $V_B$ provided by voltage source 32 is shown by the dotted line 41 and the threshold voltage needed to be exceeded for the initiation of oscillations is shown by the broken line 42. The sustaining voltage of oscillations below which the applied voltage needs to fall to terminate the oscillations is not shown but advantageously is made close to the threshold voltage and is greater than the steady voltage $V_B$. The solid line 43 depicts the effective applied voltage corresponding to superimposing the varying analogue voltage to be encoded on the steady bias.

In FIG. 5B is depicted the average current flowing in the circuit. In particular, it is characteristic that the average current drops sharply at a time corresponding to the time the applied voltage exceeds the threshold voltage.

In FIG. 5C is depicted the average across the load under the conditions depicted in FIG. 5A. Here too the leading edges 45 of the "negative" swings of the pulse train correspond to the times the applied voltage exceeds the threshold voltage.

As can be appreciated by workers in the pulse code art, this arrangement permits the encoding of the analogue signal into a pulse position code useful in specialized transmission systems.

It will be appreciated by a worker in the art that the specific circuit arrangements described have been simplified by elimination of all but the basic elements to facilitate exposition of my novel contribution. Typically, the operation will be at frequencies where strip lines, coaxial cables or wave guides will be advantageously used to interconnect the circuit elements with provision being made for shunting the high frequency currents across at least the DC voltage source. However, all of these techniques are well known to workers in the art and so have not been discussed in detail here.

Various embodiments and modifications other than those described herein may be made by those skilled in the art without departing from the spirit and scope of the invention.

I claim:

1. A circuit arrangement for encoding an analogue signal into a pulse position modulation code comprising:

a microwave frequency two-valley semiconductor oscillation generator characterized by the capacity to form and to propagate successive electric field traveling domains in response to an applied DC voltage in excess of a threshold value;

means providing a bias voltage of magnitude less than the threshold voltage of oscillations of the device;

means for superposing on said bias voltage the analogue voltage to be encoded, the sum of the bias voltage and at least part of the analogue voltage being greater than the threshold value, whereby the semiconductive device is excited to an oscillatory state whenever the amplitude of the analogue voltage exceeds a prescribed level, thereby developing a pulse position modulation code composed of microwave frequency current having an envelope forming a series of pulses each having a duration determined by said analogue voltage; and means for deriving for utilization the pulse position modulation train developed.

2. A circuit arrangement for regenerating a pulse train from a source, which pulse train has become distorted in transmission, and to transmit to an appropriate load a pulse train relatively free of such distorting comprising: